US009475919B2

(12) United States Patent
Boday et al.

(10) Patent No.: US 9,475,919 B2
(45) Date of Patent: Oct. 25, 2016

(54) SMART COMPOSITES CONTAINING MODIFIED CELLULOSIC NANOMATERIALS

(71) Applicant: International Business Machines Corporation, Armonk, NY (US)

(72) Inventors: Dylan J. Boday, Tucson, AZ (US); Joseph Kuczynski, North Port, FL (US); Robert E. Meyer, III, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/675,145

(22) Filed: Mar. 31, 2015

(65) Prior Publication Data

US 2015/0259514 A1 Sep. 17, 2015

Related U.S. Application Data

(62) Division of application No. 14/203,975, filed on Mar. 11, 2014, now Pat. No. 9,127,158.

(51) Int. Cl.

| C08L 1/26 | (2006.01) |
|---|---|
| C08K 7/02 | (2006.01) |
| C08L 67/04 | (2006.01) |
| C08L 67/02 | (2006.01) |
| C08L 69/00 | (2006.01) |
| C08L 1/02 | (2006.01) |
| C08B 15/00 | (2006.01) |
| C08B 15/06 | (2006.01) |
| C08L 1/08 | (2006.01) |
| C08L 55/02 | (2006.01) |

(52) U.S. Cl.
CPC ............... *C08K 7/02* (2013.01); *C08B 15/00* (2013.01); *C08B 15/005* (2013.01); *C08B 15/06* (2013.01); *C08L 1/02* (2013.01); *C08L 1/08* (2013.01); *C08L 55/02* (2013.01); *C08L 67/02* (2013.01); *C08L 67/04* (2013.01); *C08L 69/00* (2013.01); *C08L 2203/206* (2013.01); *C08L 2205/025* (2013.01); *C08L 2205/16* (2013.01); *C08L 2312/02* (2013.01)

(58) Field of Classification Search
CPC .......... C08L 1/02; C08L 67/04; C08L 67/02; C08L 69/00; C08L 25/12; C08L 2205/025; C08L 2312/02; C08L 2202/206
USPC ........................................................ 524/42
See application file for complete search history.

(56) References Cited

U.S. PATENT DOCUMENTS

| 2012/0135234 A1 | 5/2012 | Netravali et al. |
|---|---|---|
| 2012/0182693 A1 | 7/2012 | Boday et al. |
| 2012/0244357 A1 | 9/2012 | Leung et al. |
| 2013/0171439 A1* | 7/2013 | Shoseyov ............. B82Y 30/00 428/220 |

FOREIGN PATENT DOCUMENTS

| EP | 2428610 A1 | 3/2012 |
|---|---|---|
| GB | 1263961 | 2/1972 |
| JP | 1163061 A | 6/1989 |
| JP | 2011132450 A | 7/2011 |
| KR | 1020110075991 A | 7/2011 |

OTHER PUBLICATIONS

McElhanon et al., "Thermally Cleavable Surfactants Based on Furan-Maleimide Diels-Alder Adducts", Langmuir, vol. 21, No. 8, 2005, pp. 3259-3266.
Boday, Dylan J., "Surface Modified Cellulose Nanocrystals for use as in Durable Good Applications", 2013 TAPPI International Conference on Nanotechnology for Renewable Materials, Jun. 25, 2013, 20 pages.
Boday et al., "Sustainable Materials for IT Applications", 2012 TAPPI International Conference on Nanotechnology for Renewable Materials, Jun. 5, 2012, 44 pages.
U.S. Appl. No. 14/203,975, to Boday et al., entitled "Smart Composites Containing Modified Cellulosic Nanomaterials", filed Mar. 11, 2014, assigned to International Business Machines Corporation.
U.S. Appl. No. 14/675,861, to Boday et al., entitled "Smart Composites Containing Modified Cellulosic Nanomaterials", filed Apr. 1, 2015, assigned to International Business Machines Corporation.

* cited by examiner

*Primary Examiner* — Hui Chin
(74) *Attorney, Agent, or Firm* — Matthew J. Bussan

(57) ABSTRACT

In accordance with some embodiments of the present invention, a composite material is prepared by blending a bio-derived filler into a polymer, wherein the filler includes a diene-modified cellulosic nanomaterial (e.g., cellulose nanocrystals (CNCs) and/or cellulose nanofibrils (CNFs) functionalized to contain a diene) and a dienophile-modified cellulosic nanomaterial (e.g., CNCs and/or CNFs functionalized to contain a dienophile). The modulus of the composite material is reversibly controllable by adjusting a degree of crosslinking between the diene-modified cellulosic nanomaterial and the dienophile-modified cellulosic nanomaterial. This degree of crosslinking is thermally reversible. On one hand, the degree of crosslinking may be increased via a Diels-Alder (DA) cycloaddition reaction at a first temperature, thereby increasing the modulus of the composite material. On the other hand, the degree of crosslinking may be decreased via a retro-DA reaction at a second temperature higher than the first temperature, thereby decreasing the modulus of the composite material.

13 Claims, 2 Drawing Sheets

SMART COMPOSITES CONTAINING MODIFIED CELLULOSIC NANOMATERIALS

CROSS-REFERENCE TO RELATED APPLICATION

This patent application is a divisional application of pending U.S. patent application Ser. No. 14/203,975, filed Mar. 11, 2014, entitled "SMART COMPOSITES CONTAINING MODIFIED CELLULOSIC NANOMATERIALS", which is hereby incorporated herein by reference in its entirety.

BACKGROUND

The present invention relates in general to the field of materials science. More particularly, the present invention relates to composite materials having a reversibly controllable modulus and containing a bio-derived filler blended with a polymer, wherein the filler includes a diene-modified cellulosic nanomaterial and a dienophile-modified cellulosic nanomaterial.

SUMMARY

In accordance with some embodiments of the present invention, a composite material is prepared by blending a bio-derived filler into a polymer, wherein the filler includes a diene-modified cellulosic nanomaterial (e.g., cellulose nanocrystals (CNCs) and/or cellulose nanofibrils (CNFs) functionalized to contain a diene) and a dienophile-modified cellulosic nanomaterial (e.g., CNCs and/or CNFs functionalized to contain a dienophile). The modulus of the composite material is reversibly controllable by adjusting a degree of crosslinking between the diene-modified cellulosic nanomaterial and the dienophile-modified cellulosic nanomaterial. This degree of crosslinking is thermally reversible. On one hand, the degree of crosslinking may be increased via a Diels-Alder (DA) cycloaddition reaction at a first temperature, thereby increasing the modulus of the composite material. On the other hand, the degree of crosslinking may be decreased via a retro-DA reaction at a second temperature higher than the first temperature, thereby decreasing the modulus of the composite material.

BRIEF DESCRIPTION OF THE SEVERAL VIEWS OF THE DRAWINGS

Embodiments of the present invention will hereinafter be described in conjunction with the appended drawings, where like designations denote like elements.

DETAILED DESCRIPTION

Figure 1:
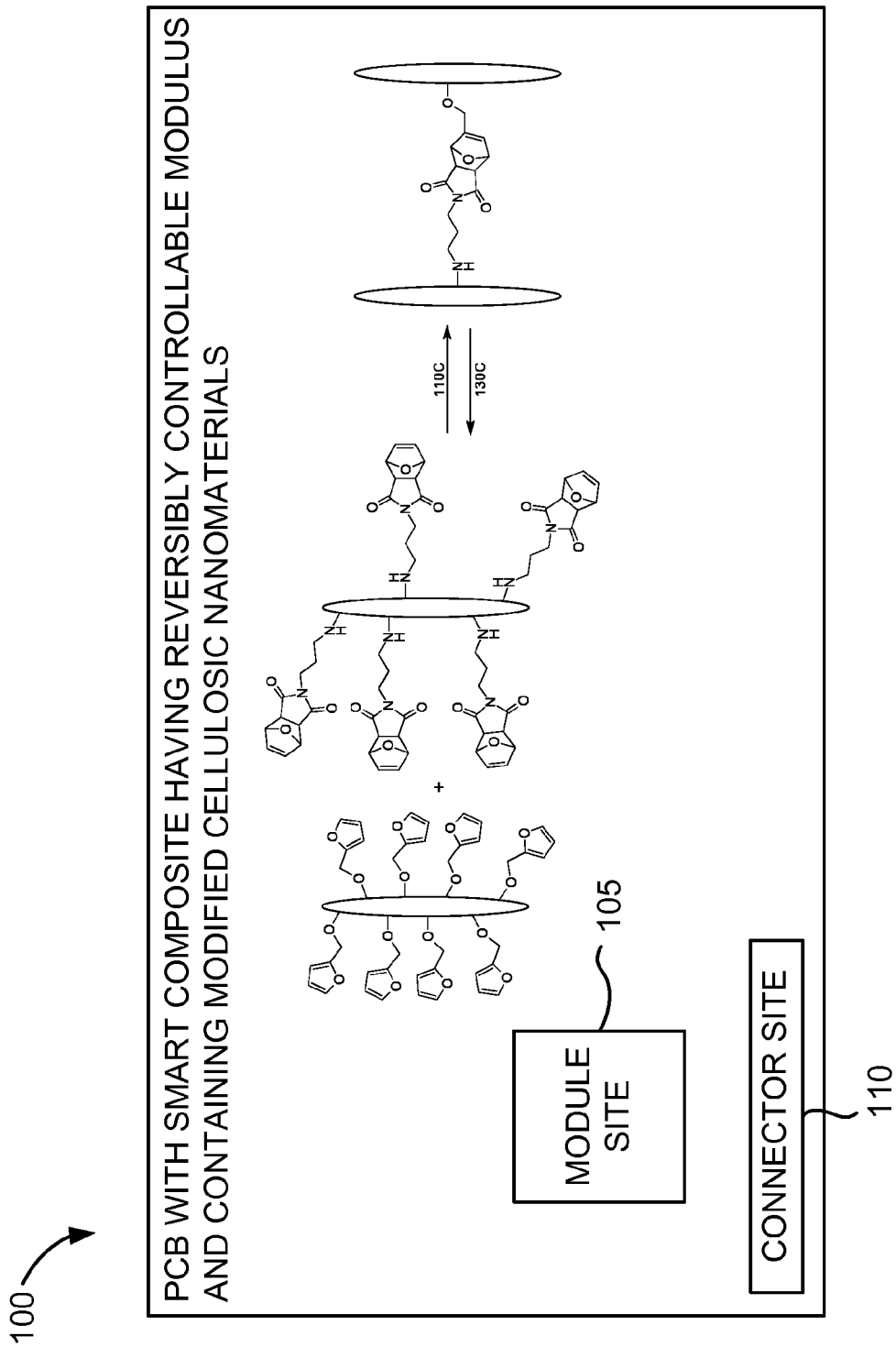
FIG. 1 is a block diagram illustrating an exemplary printed circuit board (PCB) having layers of dielectric material that incorporate a smart composite having a reversibly controllable modulus and containing modified cellulosic nanomaterials in accordance with some embodiments of the present invention.

For purposes of this document, including the claims, the term "modulus" refers to the tensile modulus of a material. Tensile modulus is a measure of the stiffness of a material. Tensile modulus is also known as Young's modulus and elastic modulus.

There currently is no means to reversibly control the modulus of a composite material after the material has been processed. Numerous applications exist where it would be beneficial to have a low modulus composite material that can be easily deformed or compressed; yet in service, it would be beneficial to increase the modulus of that same composite material (e.g., to prevent creep or stress relaxation). For example, a lower modulus state of a composite material may be beneficial when a product is being manufactured and/or reworked and/or maintained, and a higher modulus state of the composite material may be beneficial when the product is in service. Exemplary applications include, but are not limited to, the composite materials used to produce printed circuit boards (PCBs), connectors, and enclosure panels.

Cellulosic nanomaterials (e.g., cellulose nanocrystals (CNCs) and/or cellulose nanofibrils (CNFs)) can be used as a filler to control the rheology of numerous formulations as well as the physical properties of composite materials incorporating them. Cellulosic nanomaterials are bio-derived (typically from trees, but may also be produced from other plants). Cellulosic nanomaterials are also referred to as nanocellulose. Generally, cellulosic nanomaterials have a diameter between 5 nm to 500 nm and a length between tens of nm to hundreds of μm. Many cellulosic nanomaterials are commercially available. Cellulosic nanomaterials may also be produced using techniques well known to those skilled in the art.

Cellulosic materials include, but are not limited to, CNCs and CNFs. CNCs and CNFs are two different colloidal forms of cellulose. CNCs and CNFs are prepared from pulp fibers, typically from trees. CNCs are typically prepared through acid hydrolysis of pulp fibers. CNCs are commercially available from suppliers such as CelluForce (Montreal, Canada). For example, CelluForce offers CNCs with specified average dimensions of 5 nm diameter and 100 nm length. CNFs are typically prepared through mechanical disintegration of pulp fibers. CNFs are commercially available from suppliers such as Rayonier Inc. (Jacksonville, Fla., USA) and Daicel FineChem Ltd. (Tokyo, Japan). The respective shape of CNCs and CNFs may be compared to "rice" and "spaghetti".

CNCs, CNFs and other cellulosic nanomaterials used as a filler in a composite material undergo H-bonding to form a network of dispersed particles. However, hydrogen bonds are weak and can be easily ruptured. In accordance with some embodiments of the present invention, individual CNCs, CNFs or other cellulosic nanomaterials are covalently linked on demand. By doing so, the modulus of the composite material can be altered (i.e., formation of the covalent bond results in a dramatic increase in modulus). By functionalizing CNCs, CNFs or other cellulosic nanomaterials to contain either a diene or a dienophile, in accordance with some embodiments of the present invention, Diels-Alder chemistry may be utilized to crosslink/uncrosslink the CNCs, CNFs or other cellulosic nanomaterials.

An exemplary synthetic procedure to modify CNCs with either a diene (Reaction Scheme 1) or a dienophile (Reaction Scheme 2) is illustrated below. The reaction between the diene and the dienophile occurs at 110 C to crosslink the CNCs via a Diels-Alder (DA) cycloaddition reaction (Reaction Scheme 3, Upper Arrow) as illustrated below. The crosslink between the CNCs may be reversed via a retro-DA reaction at 130 C (Reaction Scheme 3, Lower Arrow) as illustrated below.

Reaction Scheme 1

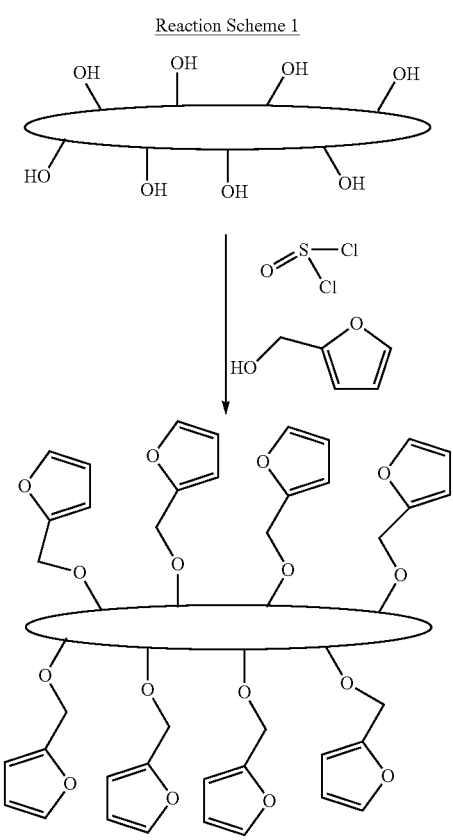

In the exemplary synthetic procedure illustrated in Reaction Scheme 1, a diene-modified CNC is synthesized by reacting hydroxyl groups on the surface of a CNC with a suitable diene, such as 2-(hydroxymethyl)furan, in the presence of thionyl chloride. This reaction occurs at room temperature. Stoichiometric quantities of the reactants may be used. That is, a stoichiometric quantity of 2-(hydroxyl methyl)furan may react with all of the hydroxyl groups on the surface of the CNC. On the other hand, it may be desirable to adjust the degree of diene-modification of the CNC by, for example, reacting less than the stoichiometric quantity of 2-(hydroxyl methyl)furan relative to the number of hydroxyl groups on the surface of the CNC. Adjustment of the degree of diene-modification of the CNC may be used to control the resulting modulus of the composite material. That is, the degree of diene-modification of the CNC may be used to control an upper limit relative to the number of diene groups available for the subsequent Diels-Alder cycloaddition reaction (Reaction Scheme 3), described below.

The exemplary synthetic procedure to synthesize the diene-modified CNC illustrated in Reaction Scheme 1 is set forth for purposes of illustration and not limitation. Any suitable diene-modified cellulosic nanomaterial (e.g., CNC and/or CNF) may be synthesized using techniques well known in the art. For example, the reaction utilized in Reaction Scheme 1 to couple the diene moiety to the surface of the CNC may be replaced with any suitable coupling chemistry to couple any suitable diene moiety to the surface on any suitable cellulosic nanomaterial. For example, alkoxysilanes or chlorosilanes can be condensed on the surface of a cellulosic nanoparticle to yield a cellulosic nanoparticle containing numerous pendant diene groups. Cellulosic nanomaterial surfaces offer numerous possibilities for surface modification from which to choose a suitable coupling chemistry. For example, the surface of a cellulosic nanoparticle may be functionalized to contain a functional group such as isocyanate, vinyl, amine, or epoxy.

Suitable diene moieties include, but are not limited to, furans, pyrroles, or thiophenes.

Reaction Scheme 2

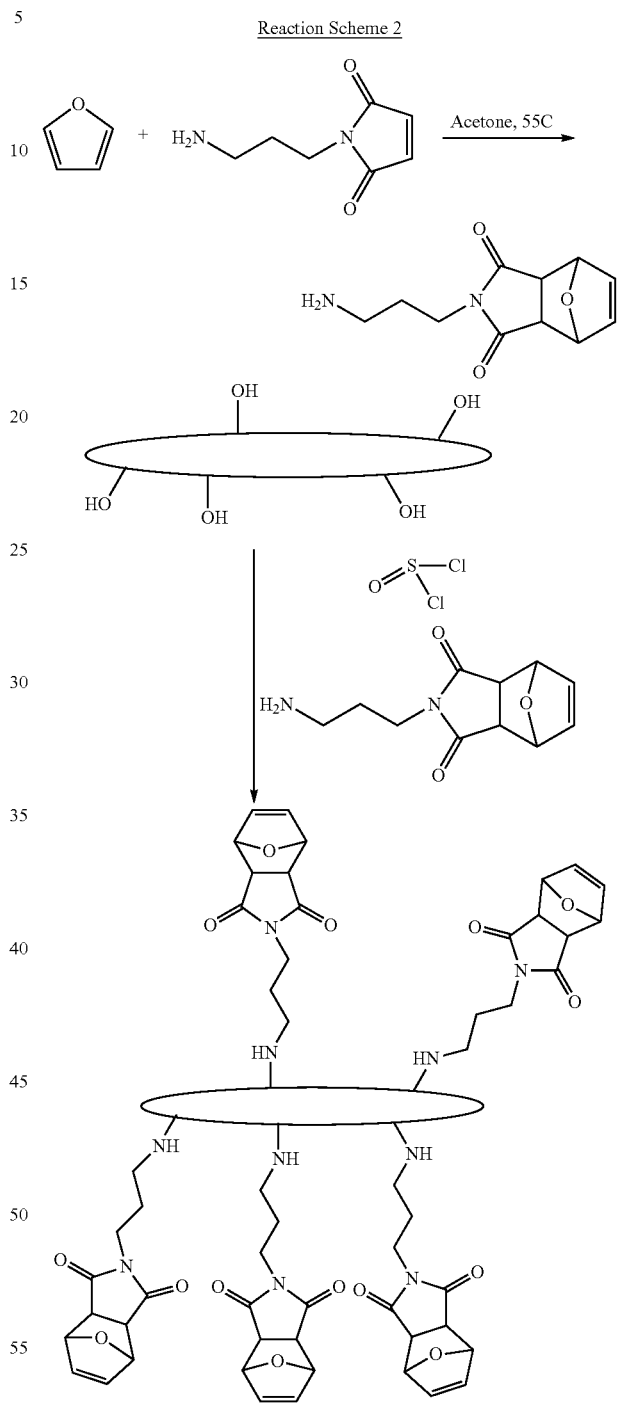

In the exemplary synthetic procedure illustrated in Reaction Scheme 2, a dienophile-modified CNC is synthesized using two steps. In the first step of Reaction Scheme 2, a suitable dienophile, such as 7-oxabicyclo[2.2.1]hept-5-ene-2,3-dicarboxy-N-(2-aminopropyl)imide, is synthesized. For example, 7-oxabicyclo[2.2.1]hept-5-ene-2,3-dicarboxy-N-(2-aminopropyl)imide may be synthesized by reacting furan with N-(2-aminopropyl)maleimide in the presence of acetone at 55 C. Generally, stoichiometric quantities of the reactants may be used. In the second step of Reac- Scheme 2, a dienophile-modified CNC is synthesized by reacting hydroxyl groups on the surface of a CNC with a suitable dienophile, such as 7-oxabicyclo[2.2.1]hept-5-ene-2,3-dicarboxy-N-(2-aminopropyl)imide, in the presence of thionyl chloride. This reaction occurs at room temperature. Stoichiometric quantities of the reactants may be used. That is, a stoichiometric quantity of 7-oxabicyclo[2.2.1]hept-5-ene-2,3-dicarboxy-N-(2-aminopropyl)imide may react with all of the hydroxyl groups on the surface of the CNC. On the other hand, it may be desirable to adjust the degree of dienophile-modification of the CNC by, for example, reacting less than the stoichiometric quantity of 7-oxabicyclo[2.2.1]hept-5-ene-2,3-dicarboxy-N-(2-aminopropyl)imide relative to the number of hydroxyl groups on the surface of the CNC. Adjustment of the degree of dienophile-modification of the CNC may be used to control the resulting modulus of the composite material. That is, the degree of dienophile-modification of the CNC may be used to control an upper limit relative to the number of dienophile groups available for the subsequent Diels-Alder cycloaddition reaction (Reaction Scheme 3), described below.

The exemplary synthetic procedure illustrated in Reaction Scheme 2 is set forth for purposes of illustration and not limitation. Any suitable dienophile-modified cellulosic nanomaterial (e.g., CNC and/or CNF) may be synthesized using techniques well known in the art. For example, the reaction utilized in Reaction Scheme 2 to couple the dienophile moiety to the surface of the CNC may be replaced with any suitable coupling chemistry to couple any suitable dienophile moiety to the surface on any suitable cellulosic nanomaterial. For example, alkoxysilanes or chlorosilanes can be condensed on the surface of a cellulosic nanoparticle to yield a cellulosic nanoparticle containing numerous pendant dienophile groups. Cellulosic nanomaterial surfaces offer numerous possibilities for surface modification from which to choose a suitable coupling chemistry. For example, the surface of a cellulosic nanoparticle may be functionalized to contain a functional group such as isocyanate, vinyl, amine, or epoxy.

Suitable dienophile moieties include compounds having a di-substituted alkene bearing electron withdrawing groups on both sides of the double bond. Suitable electron withdrawing groups include, for example, ester, amide or keto groups. Dienophiles also include compounds which contain a but-2-ene-1,4-dione moiety that are contained in a 5- or 6-membered ring. For example, the dienophile may be a maleimide (i.e., a 5-membered ring) moiety. Examples of other suitable dienophiles include, bis(triazolinediones), bis(phthalazinediones), quinones, bis(tricyanoethylenes) bis(azodicarboxylates), diacrylates, maleate or fumarate polyesters, acetylenedicarboxylate polyesters.

Reaction Scheme 3

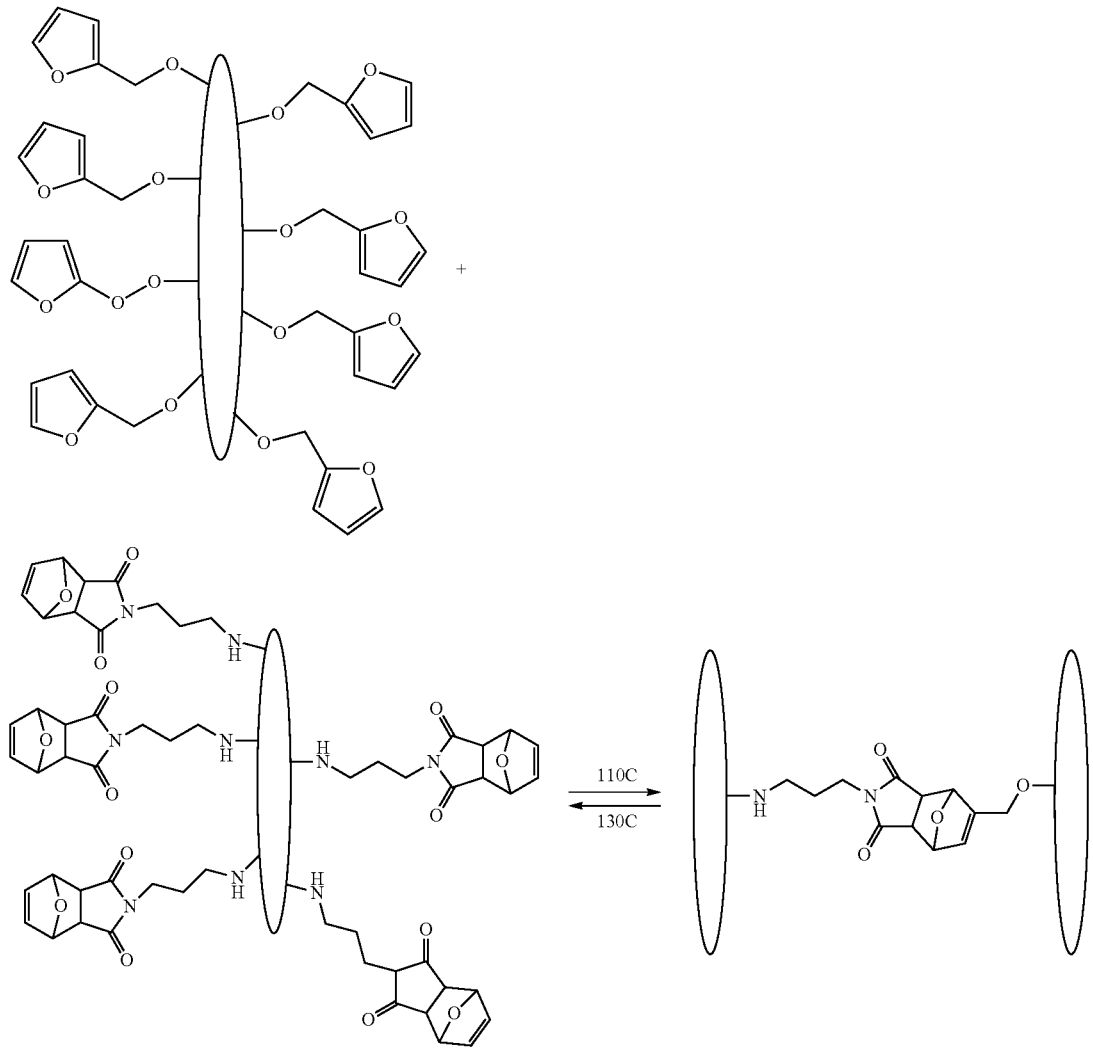

A crosslinked network can be generated by simply heating the modified CNCs at 110 C, in accordance with some embodiments of the present invention, to form the crosslinked structure illustrated in Reaction Scheme 3 (Upper Arrow) via the Diels-Alder cycloaddition reaction. This crosslinked structure is referred to as a Diels-Alder adduct. Although a single crosslink or Diels-Alder adduct is illustrated in Reaction Scheme 3, one skilled in the art will appreciate that numerous sites along the CNC are modified so that each CNC may be crosslinked to any number of other CNCs. Heating the composite material at 110 C induces the formation of Diels-Alder adducts and thereby generates a crosslinked network. This enables the ability to control the resulting modulus of a composite material into which the modified CNCs are blended simply by adjusting the degree of modification of the different CNCs, as described above, as well as the residence time at 110 C. The crosslinked network generated by heating the modified CNCs at 110 C remains after the composite material cools below 110 C. When it is desired to decrease the modulus, the composite material is heated to 130 C, in accordance with some embodiments of the present invention, to facilitate the retro-DA reaction illustrated in Reaction Scheme 3 (Lower Arrow). When it is desired to once more increase the modulus, cooling the composite material to a temperature under 130 C again induces the formation of Diels-Alder adducts and thereby regenerates the crosslinked network.

The Diels-Alder (DA) cycloaddition reaction and the retro-DA reaction illustrated in Reaction Scheme 3 are set forth for purposes of illustration and not limitation. In accordance with some embodiments of the present invention, the DA reaction and the retro-DA reaction may occur under any suitable reaction conditions between any suitable diene-modified cellulosic nanomaterial (e.g., CNC and/or CNF) and any suitable dienophile-modified cellulosic nanomaterial (e.g., CNC and/or CNF).

A composite material in accordance with some embodiments of the present invention is prepared by blending a bio-derived filler into a polymer, wherein the filler includes different modified cellulosic nanomaterials (i.e., diene-modified cellulosic nanomaterial and dienophile-modified cellulosic nanomaterial). The modulus of the composite material is reversibly controllable by adjusting a degree of crosslinking between different modified cellulosic nanomaterials. This degree of crosslinking is thermally reversible. On one hand, the degree of crosslinking may be increased via a Diels-Alder (DA) cycloaddition reaction at a first temperature, thereby increasing the modulus of the composite material. On the other hand, the degree of crosslinking may be decreased via a retro-DA reaction at a second temperature higher than the first temperature, thereby decreasing the modulus of the composite material.

In accordance with some embodiments of the present invention the diene-modified cellulosic nanomaterial is combined with the dienophile-modified cellulosic material to form a homogeneous mixture. For example, the different cellulosic nanomaterials may be mixed using solvent mixing. One skilled in the art will appreciate that the different cellulosic nanomaterials may be mixed using any suitable technique known to those skilled in the art. The mixture is then blended into a polymer. For example, the mixture may be blended with the polymer using a twin screw extruder. One skilled in the art will appreciate that the mixture may be blended into the polymer using any suitable technique known to those skilled in the art. Advantageously, the mixture is not set (i.e., not crosslinked) at room temperature because the crosslinking Diels-Alder cycloaddition reaction typically has an onset temperature well above room temperature, e.g., about 90 C and higher. Similar to other thermosetting materials, this characteristic permits the mixture to be blended into the polymer and thereby form the composite material. Heating the composite material to a temperature above the onset temperature induces the formation of Diels-Alder adducts and thereby yields a crosslinked network. The crosslinked network is retained after the composite material cools below the onset temperature. The Diels-Alder adducts undergo reversion to the diene-modified cellulosic nanomaterial and the dienophile-modified cellulosic nanomaterial in a substantially uncrosslinked state via a retro-DA reaction at or above a reversion temperature. The reversion temperature is greater than the onset temperature. Cooling the composite material back to a temperature under the reversion temperature again induces the formation of Diels-Alder adducts and the crosslinked state returns.

In lieu of blending the mixture into the polymer at a temperature below the onset temperature, the mixture may be blended into the polymer at a temperature equal to or above the reversion temperature. Cooling the composite material to under the reversion temperature then induces the formation of Diels-Alder adducts and thereby yields a crosslinked network.

Also, in lieu of blending the mixture into the polymer, the diene-modified cellulosic nanomaterial and the dienophile-modified nanomaterial may be individually blended into the polymer. For example, the diene-modified cellulosic nanomaterial and the dienophile-modified nanomaterial may be individually blended into the polymer using separate feed hoppers attached to a twin screw extruder. One skilled in the art will appreciate that the different cellulosic nanomaterials may be individually blended into the polymer using any suitable technique known to those skilled in the art.

The amount of the bio-derived filler (i.e., the diene-modified cellulosic nanomaterial and the dienophile-modified nanomaterial) used in the composite material may be empirically determined based, at least in part, on the desired modulus when the crosslinked network of Diels-Alder adducts is formed. Formation of the crosslinked network of Diels-Alder adducts can increase the modulus of the composite material several orders of magnitude (as compared to the modulus of the same composite material before formation of the crosslinked network of Diels-Alder adducts or after the Diels-Alder adducts undergo reversion). The increase in the modulus of the composite material depends on a number of factors including, for example, the bio-derived filler loading, the degree of modification (i.e., diene-modification and dienophile-modification) of the cellulosic nanomaterials, and the degree of crosslinking between the diene-modified cellulosic nanomaterial and the dienophile-modified cellulosic nanomaterial. One skilled in the art will appreciate, however, that additional factors beyond the increase in the modulus of the composite material may figure into the determination of the amount of the bio-derived filler to use in the composite material. Such additional factors include, for example, the rheology of composite material, as well as other physical properties of the composite material. Typically, the bio-derived filler loading (i.e., combined weight of the diene-modified cellulosic nanomaterial and the dienophile-modified nanomaterial as a percentage of the total weight of the composite material) will be within the range of 1% to 50%.

Typically, the ratio of the weight of the diene-modified cellulosic nanomaterial with respect to the weight of the dienophile-modified cellulosic nanomaterial will be approximately 50:50. This ratio will vary, however, depending on a number of factors including, for example, the degree of diene-modification of the diene-modified cellulosic nanomaterial relative to the degree of dienophile-modification of the dienophile-modified cellulosic nanomaterial, as well as the molecular weight of the diene-modified cellulosic nanomaterial relative to the molecular weight of the dienophile-modified cellulosic nanomaterial.

The use of synthetic polymers from petroleum sources is widespread. Petroleum-derived synthetic polymers, such as polycarbonate (PC) and acrylonitrile butadiene styrene (ABS), can be found in nearly every item we use in our daily lives. There is a growing shift to prepare polymeric materials from renewable feedstocks because petroleum is a finite resource. The use of these renewable polymers is envisaged in applications from disposable products to durable goods. Some bio-derived polymers are already being produced on a commercial scale (e.g., polylactic acid (PLA)). PLA is a good candidate to replace polycarbonates (PC) and PC blends (e.g., PC/ABS). Other bio-derived polymers, such as polyhydroxyalkanoate (PHA) and polybutylene succinate (PBS), are also good candidates.

A bio-derived filler that includes diene-modified cellulosic material and dienophile-modified cellulosic material, in accordance with some embodiments of the present invention, may be blended with one or more petroleum-derived polymers (e.g., acrylonitrile butadiene styrene (ABS)) and/or one or more bio-derived polymers (e.g., polylactic acid (PLA), polyhydroxyalkanoate (PHA), polybutylene succinate (PBS), polyhydroxybutyrate (PHB), and the like) to reversibly control the modulus of the resulting composite material. For example, in accordance with some embodiments of the present invention, a bio-derived filler that includes diene-modified cellulosic nanomaterial and dienophile-modified cellulosic nanomaterial may be blended with a conventional sheet molding compound (SMC) (e.g., fiberglass reinforced epoxy) to reversibly control the modulus of the resulting composite material.

A bio-derived filler that includes diene-modified cellulosic material and dienophile-modified cellulosic material, in accordance with some embodiments of the present invention, may also serve to increase the renewable content in the resulting composite material (as compared to the use of conventional fillers).

An exemplary printed circuit board (PCB) implementation of the present invention is described below with reference to FIG. 1, while an exemplary connector implementation and an exemplary plastic enclosure panel implementation of the present invention are described below with reference to FIG. 2. However, those skilled in the art will appreciate that the present invention applies equally to any manufactured article that employs thermosetting polymers (also known as "thermosets") or thermoplastics.

FIG. 1 is a block diagram illustrating an exemplary printed circuit board (PCB) 100 having layers of dielectric material that incorporate a smart composite having a reversibly controllable modulus and containing modified cellulosic nanomaterials in accordance with some embodiments of the present invention. Each layer of dielectric material may, for example, comprise a composite material that includes a polymer, such as epoxy resin reinforced with fiberglass, and a bio-derived filler blended into the polymer, wherein the filler includes diene-modified cellulosic material and dienophile-modified cellulosic material to reversibly control the modulus of the composite material. In the embodiment illustrated in FIG. 1, the PCB 100 includes one or more module sites 105 and one or more connector sites 110. The configuration of the PCB 100 shown in FIG. 1 is for purposes of illustration and not limitation.

In accordance with some embodiments of the present invention, each layer of dielectric material of the PCB 100 may, for example, comprise a composite material that includes a sheet molded compound (SMC) of fiberglass reinforced epoxy into which is blended a bio-derived filler that includes diene-modified cellulosic material and dienophile-modified cellulosic material to reversibly control the modulus of the composite material.

Figure 2:
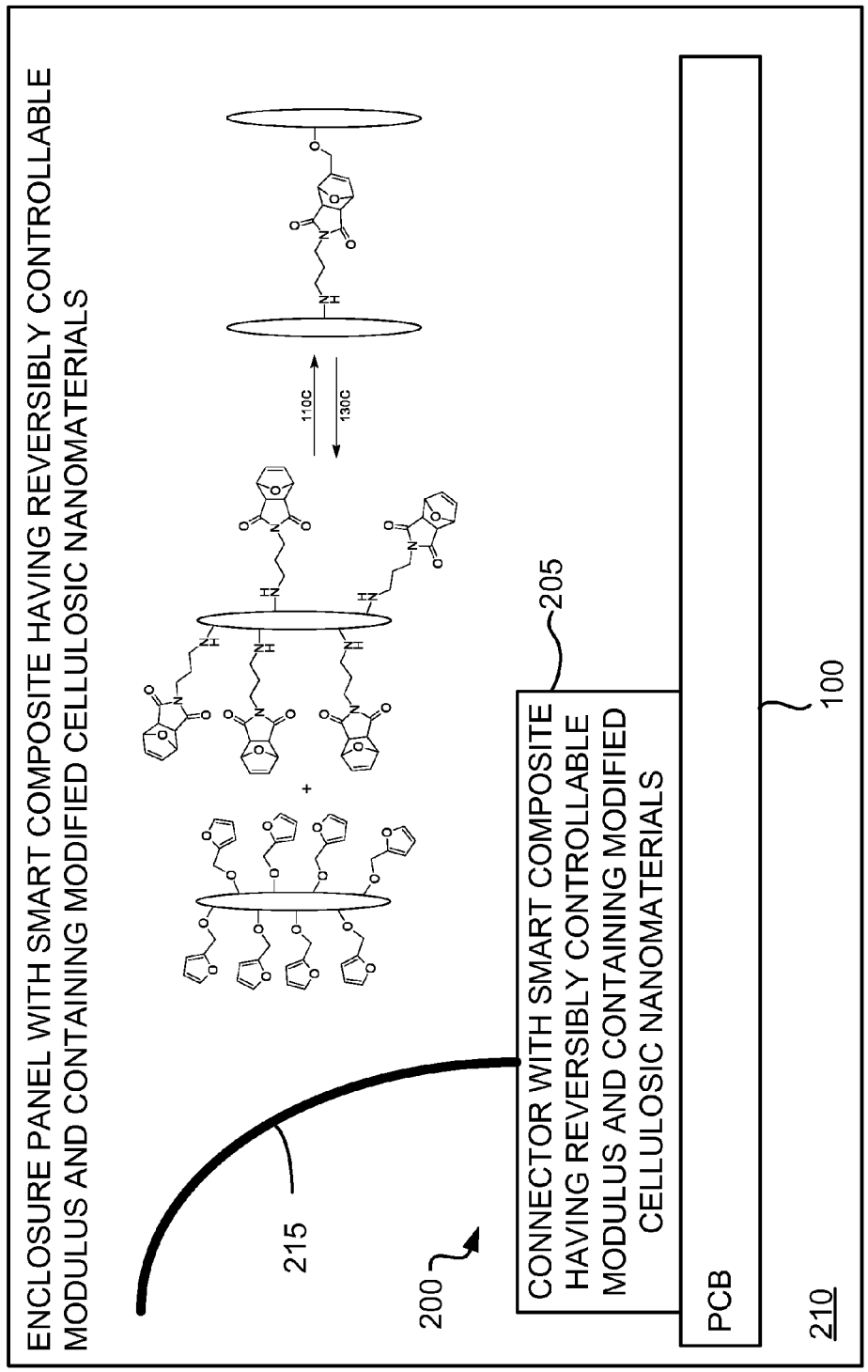
FIG. 2 is a block diagram illustrating an exemplary connector having a plastic housing and an exemplary plastic enclosure panel each of which incorporates a smart composite having a reversibly controllable modulus and containing modified cellulosic nanomaterials in accordance with some embodiments of the present invention.

FIG. 2 is a block diagram illustrating an exemplary connector 200 having a plastic housing 205 and an exemplary plastic enclosure panel 210 that incorporate a smart composite having a reversibly controllable modulus and containing modified cellulosic nanomaterial in accordance with some embodiments of the present invention. In the embodiment illustrated in FIG. 2, the connector 200 is configured to make electrical contact with the connector site 110 (shown in FIG. 1) of the PCB 100. Also in the embodiment illustrated in FIG. 2, the connector 200 includes a cable 215. The configuration of the connector 200 and the configuration of the plastic enclosure panel 210 shown in FIG. 2 are for purposes of illustration and not limitation.

In accordance with some embodiments of the present invention, the plastic housing 205 of the connector 200 may, for example, comprise a composite material that includes a polymer, such as liquid crystal polymer (LCP), and a bio-derived filler blended into the polymer, wherein the filler includes diene-modified cellulosic material and dienophile-modified cellulosic material to reversibly control the modulus of the composite material.

In accordance with some embodiments of the present invention, the plastic enclosure panel 210 may, for example, comprise a composite material that includes a polymer and a bio-derived filler blended into the polymer, wherein the filler includes diene-modified cellulosic material and dienophile-modified cellulosic material to reversibly control the modulus of the composite material. The polymer may be any suitable petroleum-derived polymer and/or any suitable bio-derived polymer. Suitable petroleum-derived polymers include, but are not limited to, polycarbonates (PC), acrylonitrile butadiene styrene (ABS), and blends thereof. Suitable bio-derived polymers include, but are not limited to, polylactic acid (PLA), polyhydroxyalkanoate (PHA), polybutylene succinate (PBS), and blends thereof. Plastic enclosure panels are often referred to as "thermoplastic covers".

One skilled in the art will appreciate that many variations are possible within the scope of the present invention. Several embodiments of the present invention are described above in the context of exemplary applications (e.g., printed circuit boards (PCBs), connectors, and enclosure panels). However, the present invention is also applicable to other applications. For example, some embodiments of the present invention are applicable to automotive body structure and chassis components. Thus, while the present invention has been particularly shown and described with reference to preferred embodiments thereof, it will be understood by those skilled in the art that these and other changes in form and details may be made therein without departing from the spirit and scope of the present invention.

What is claimed is:

1. A method of making composite material, comprising:
providing a polymer;
blending a bio-derived filler into the polymer, wherein the filler comprises a diene-modified cellulosic nanomaterial and a dienophile-modified cellulosic nanomaterial.

2. The method as recited in claim 1, wherein at least some of the diene-modified cellulosic nanomaterial and at least some of the dienophile-modified cellulosic nanomaterial are crosslinked to each other in a crosslinked network, further comprising:
reversibly controlling a modulus of the composite material by adjusting a degree of crosslinking between the diene-modified cellulosic nanomaterial and the dienophile-modified cellulosic nanomaterial by at least one of:
increasing the degree of crosslinking between the diene-modified cellulosic nanomaterial and the dienophile-modified cellulosic nanomaterial via a Diels-Alder (DA) cycloaddition reaction at a first temperature; and
decreasing the degree of crosslinking between the diene-modified cellulosic nanomaterial and the dienophile-modified cellulosic nanomaterial via a retro-DA reaction at a second temperature higher than the first temperature.

3. The method as recited in claim 1, wherein the diene-modified cellulosic nanomaterial comprises at least one of cellulose nanocrystals (CNCs) and cellulose nanofibrils (CNFs) functionalized to contain a diene.

4. The method as recited in claim 3, wherein the dienophile-modified cellulosic nanomaterial comprises at least one of CNCs and CNFs functionalized to contain a dienophile.

5. The method as recited in claim 4, wherein at least some of the diene-modified cellulosic nanomaterial and at least some of the dienophile-modified cellulosic nanomaterial are crosslinked to each other in a crosslinked network, further comprising:
reversibly controlling a modulus of the composite material by adjusting a degree of crosslinking between the diene-modified cellulosic nanomaterial and the dienophile-modified cellulosic nanomaterial by at least one of:
increasing the degree of crosslinking between the diene-modified cellulosic nanomaterial and the dienophile-modified cellulosic nanomaterial via a Diels-Alder (DA) cycloaddition reaction at a first temperature; and
decreasing the degree of crosslinking between the diene-modified cellulosic nanomaterial and the dienophile-modified cellulosic nanomaterial via a retro-DA reaction at a second temperature higher than the first temperature.

6. The method as recited in claim 1, wherein the diene-modified cellulosic nanomaterial comprises cellulose nanocrystals (CNCs) functionalized to contain a diene, and wherein the dienophile-modified cellulosic nanomaterial comprises CNCs functionalized to contain a dienophile.

7. The method as recited in claim 1, wherein the polymer selected from a group consisting of polylactic acid (PLA), polyhydroxyalkanoates (PHA), polybutylene succinate (PBS), polycarbonate (PC), acrylonitrile butadiene styrene (ABS), and combinations thereof.

8. A method making composite material, comprising:
providing a polymer;
blending a bio-derived filler into the polymer, wherein the filler comprises diene-modified cellulosic nanocrystals (CNCs) and dienophile-modified CNCs, wherein the diene-modified CNCs comprise CNCs functionalized to contain a diene, wherein the dienophile-modified CNCs comprise CNCs functionalized to contain a dienophile, wherein at least some of the diene-modified CNCs and at least some of the dienophile-modified CNCs are crosslinked to each other in a crosslinked network, and wherein the composite material has a modulus that is reversibly controllable by adjusting a degree of crosslinking between the diene-modified CNCs and the dienophile-modified CNCs.

9. The method as recited in claim 8, wherein the diene-modified CNCs are represented by the following formula:

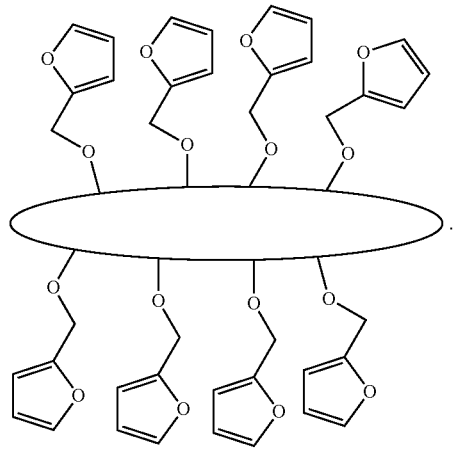

10. The method as recited in claim 9, wherein the dienophile-modified CNCs are represented by the following formula:

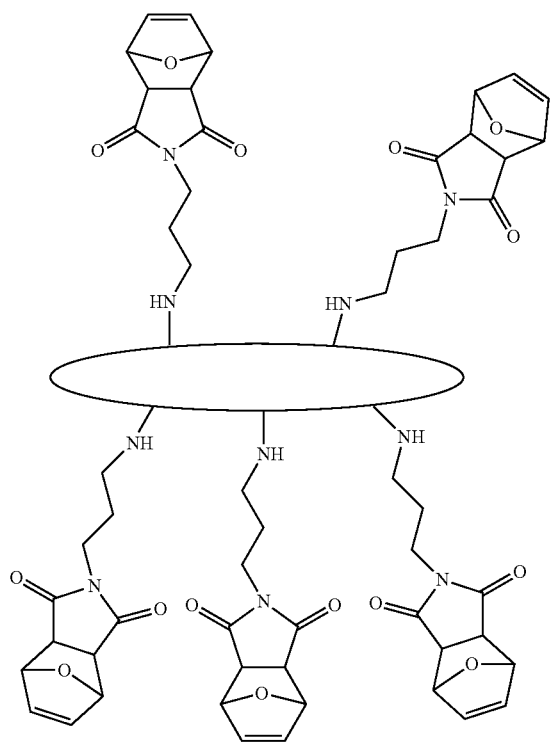

11. A method making composite material, comprising:
providing a polymer;
blending a bio-derived filler into the polymer, wherein the filler comprises a diene-modified cellulosic nanomaterial and a dienophile-modified cellulosic nanomaterial, wherein the diene-modified cellulosic nanomaterial comprises at least one of cellulose nanocrystals (CNCs) and cellulose nanofibrils (CNFs) functionalized to contain a diene, wherein the dienophile-modified cellulosic nanomaterial comprises at least one of CNCs and CNFs functionalized to contain a dienophile, wherein at least some of the diene-modified cellulosic nanomaterial and at least some of the dienophile-modified cellulosic nanomaterial are crosslinked to each other in a crosslinked network, and wherein the composite material has a modulus that is reversibly controllable by adjusting a degree of crosslinking between the diene-modified cellulosic nanomaterial and the dienophile-modified cellulosic nanomaterial.

12. The method as recited in claim 1, wherein the dienophile-modified cellulosic nanomaterial comprises at least one of cellulose nanocrystals (CNCs) and cellulose nanofibrils (CNFs) functionalized to contain a dienophile.

13. The method as recited in claim 8, wherein the dienophile-modified CNCs are represented by the following formula:

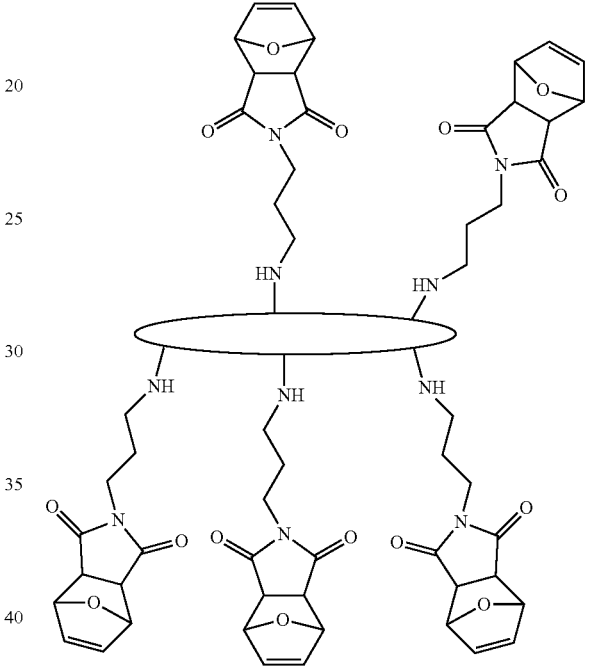

* * * * *